S. SEITNER, JR.
HARROW ATTACHMENT FOR PLOWS.
APPLICATION FILED APR. 9, 1908.
935,417.
Patented Sept. 28, 1909.
2 SHEETS—SHEET 1.
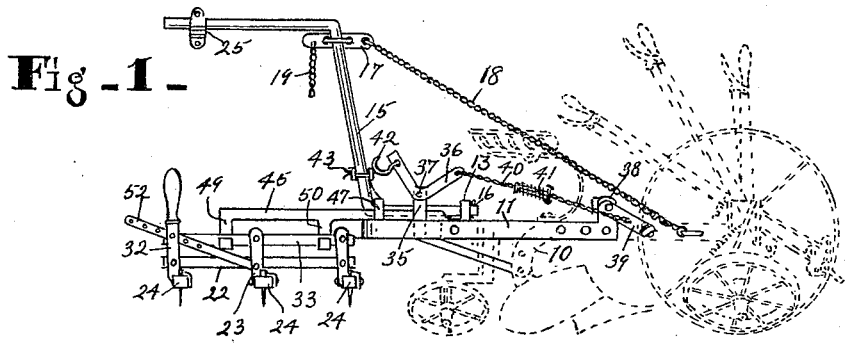
Fig-1-
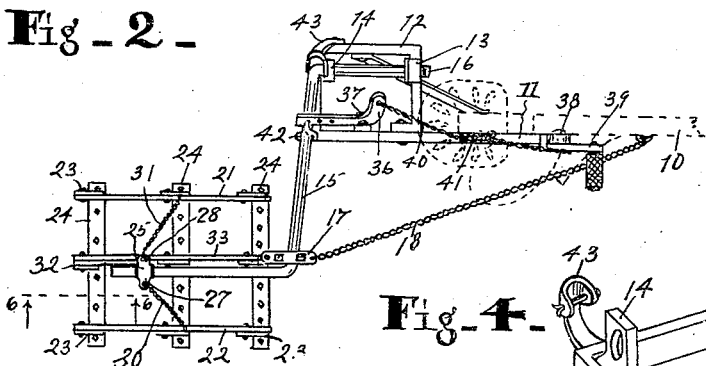
Fig-2-
Fig-4-
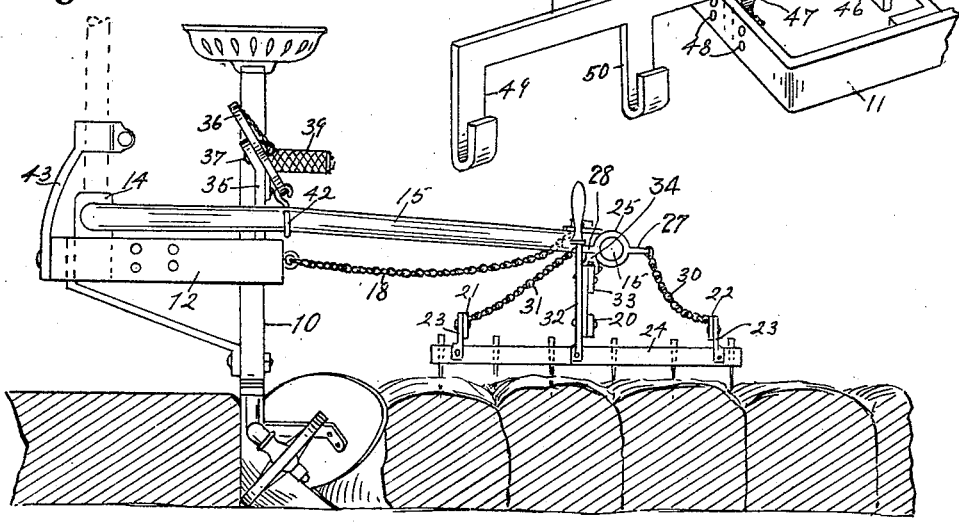
Fig-3-
WITNESSES:
J. H. Swan
Olive Breeden
INVENTOR.
Samuel Seitner Jr.
BY
V. H. Lockwood
ATTORNEY.

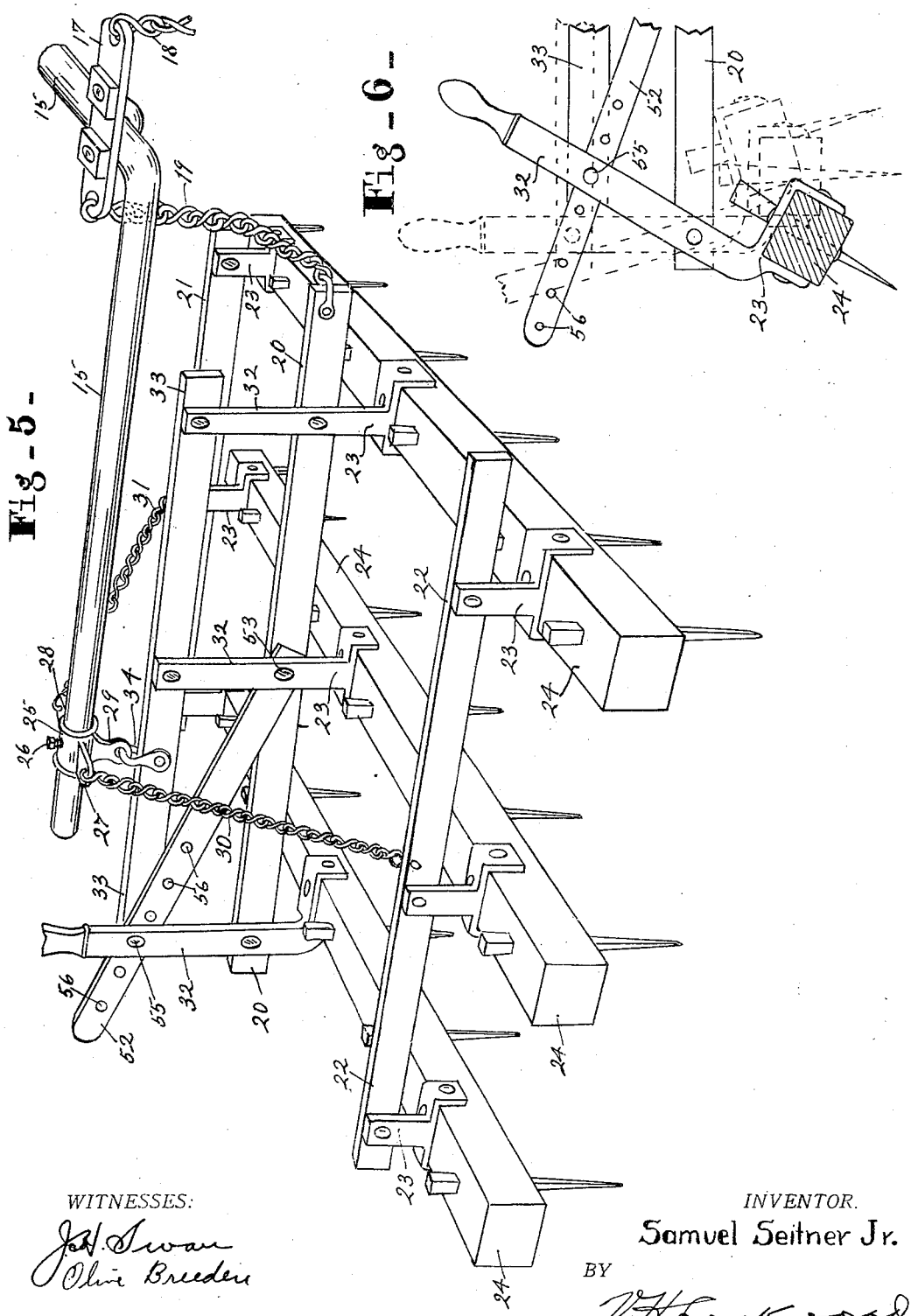

UNITED STATES PATENT OFFICE.

SAMUEL SEITNER, JR., OF ROANN, INDIANA.

HARROW ATTACHMENT FOR PLOWS.

935,417.  Specification of Letters Patent.  Patented Sept. 28, 1909.

Application filed April 9, 1908. Serial No. 426,133.

*To all whom it may concern:*

Be it known that I, SAMUEL SEITNER, Jr., of Roann, county of Wabash, and State of Indiana, have invented a certain new and useful Harrow Attachment for Plows; and I do hereby declare that the following is a full, clear, and exact description thereof, reference being had to the accompanying drawings, in which like numerals refer to like parts.

The object of this invention is to improve the construction of harrow attachments for breaking plows after the general manner illustrated in a former patent of mine, No. 890,184, granted June 9, 1908.

The improvement relates to the means for connecting the harrow to the plow, and for elevating and lowering the end of the harrow.

The full nature of this invention will be understood from the accompanying drawings and the following description and claims.

In the drawings Figure 1 is a side elevation of the device mounted on a plow ready to be transported either to or from the field, the plow being shown by dotted lines. Fig. 2 is a plan view of the device with the beam and mold board of the plow being shown by dotted lines, the other parts being broken away. Fig. 3 is a rear elevation of the device, the plow being shown in full lines and the ground in section and the crank shaft being shown in dotted lines held in an altered position. Fig. 4 is a perspective view of the rectangular frame, the forward bar being broken away and showing the means for attaching the harrow hangers. Fig. 5 is a perspective view of the harrow attached to the crank shaft, the plow and other parts being broken away. Fig. 6 is a section on the line 6—6 of Fig. 2, showing the means for tilting the harrow so that the teeth will either drag or dig, different positions of parts being shown by dotted lines.

In detail to the plow beam 10 there is bolted an iron bar 11 that at its rear end is turned at a right angle to form a rectangular frame 12. On this frame there are two upwardly extending bearings 13 and 14 in which a crank shaft 15 is mounted, the crank shaft being held in place by a key 16. The crank shaft 15 is turned almost at a right angle to the rectangular frame 12 and again at a right angle so that its outward end will be parallel with the plow beam. On the crank shaft 15 there is bolted a draw strap 17 from which a chain 18 extends to the forward part of the mold beam 10. To the rearward part of the strap 17 there is a downwardly extending chain 19 that is attached to the middle bar 20 of the harrow. The harrow consists of three parallel bars 20, 21 and 22 that are parallel with the plow beam and to these bars are mounted hinged brackets 23 to which the harrow beams 24 are bolted. To the rearward end of the crank shaft 15 there is a sleeve 25 that is held in place by a set screw 26. To this sleeve there are attached three arms 27, 28 and 29, the arms 27 and 28 being at a right angle to the crank shaft 15 and to these are attached the chains 30 and 31 that extend to the middle of the outside bars. The center brackets 23 have elongated arms 32 to the upper end of which a bar 33 is attached, that bar being directly over the center bar 20, the upper part of the rear arm 32 constituting a handle for the adjustment of the harrow. The downwardly extending arm 29 of the sleeve 25 is attached to the bar 33 by the clevis 34. This mounting of the harrow to the crank shaft 15 enables the harrow to travel over uneven ground in a balanced position, which also enables the operator by a means hereinafter described to lift the harrow clear of the ground while in operation. The harrow is drawn forward directly through the connection of the chain 18 to the mold beam and to the strap 17 on the crank shaft 15.

To the rectangular frame 12 there is mounted a standard 35 to which a bell crank lever 36 is fulcrumed at 37. The forward end of the bar 11 is turned upward at 38 and to it a foot lever 39 is attached. The foot lever 39 and the forward end of the bell crank 36 are connected by a chain 40, the center of which has a resistance spring 41. The rearward end of the bell crank 36 has a downwardly extending hook 42 that is adapted to engage the crank shaft 15 when it is in its operative position. Through the foot lever 39 and bell crank 36, the crank shaft 15 may be raised or lowered. There is also mounted on the rectangular frame 12 a bracket 43 that is adapted to hold the crank shaft 15 in an upward position when the device is being transported to or from the field as shown by dotted lines in Fig. 3.

It is possible with this invention for the operator to transport the harrow to and from the field by detaching it from the crank shaft 15 and to mount the harrow upon a hanging bar 45. The forward end of the hanging bar 45 is T-shaped and turned down and bolted to the frame 12 at the forward end by bolts 46. At the rear of the rectangular frame 12 the hanging bar 45 is held in place by a strap 47 and the bolts 48. The hanging bar 45 has two downwardly extending hooks 49 and 50 and to these hooks the upper bar 33 of the harrow is attached when the device is being transported to and from the field, as shown in Fig. 1.

When the device is in operation in a field the bar 45 and strap 47 are removed from the frame.

The harrow is preferably adjustable so that the teeth may be tilted either to drag or dig. This is accomplished by a means that will now be described. The brackets 23 are so mounted in relation to the harrow beams 24 that they may be tilted forward or backward by the rear hand lever 32 and held in a fixed position by the bar 52 which at its forward end is bolted through the bracket 23 and bar 20 by the bolt 53. At its rear end it is bolted through the hand lever 32, bar 52 and upper bar 33 by the bolt 55. The bar 52 has a number of holes 56 so that the moving of the lever 32 forward or backward to register with these holes will tilt the teeth of the harrow into either a dragging or digging position, as shown in Fig. 6.

What I claim as my invention and desire to secure by Letters Patent is:

1. A harrow attachment for a plow consisting of a rectangular frame adapted to be secured to the beam of the plow and in a horizontal position, bearings on said frame on the land side thereof while plowing, a crank shaft mounted in said bearings and extending horizontally across said frame and beyond the same, a harrow mounted on the free end of the crank shaft, and means mounted on said rectangular frame for engaging the crank shaft between its ends for elevating and lowering the same.

2. A harrow attachment for a plow consisting of a rectangular frame adapted to be secured to the beam of the plow and in a horizontal position, bearings on said frame on the land side thereof while plowing, a crank shaft mounted in said bearings and extending horizontally across said frame and beyond the same, a harrow mounted on the free end of the crank shaft, an oscillatable bell crank mounted on said rectangular frame to the side opposite the fulcrum points of said crank shaft, said bell crank being set at an inclination so its free end will move substantially concentrically with the crank shaft, a hook on the free end of the bell crank to engage the crank shaft, a pedal, and a connection between the pedal and the bell crank for operating it, whereby the crank shaft and harrow will be elevated or lowered.

In witness whereof, I have hereunto affixed my signature in the presence of the witnesses herein named.

SAMUEL SEITNER, JR.

Witnesses:
J. B. LOCKRIDGE,
ARES FLORA.